United States Patent [19]

Mehren

[11] 3,715,269

[45] Feb. 6, 1973

[54] CONTROL ROD DRIVE UNITS FOR NUCLEAR REACTORS

[75] Inventor: Franz Mehren, Porz-Urbach, Germany

[73] Assignee: Interatom Internationale Atomreaktorbau GmbH, Bensberg/Cologne, Germany

[22] Filed: May 21, 1969

[21] Appl. No.: 826,308

[52] U.S. Cl. ............................................... 176/36 R
[51] Int. Cl. ............................................... G21c 7/08
[58] Field of Search .................................. 176/36, 86

[56] References Cited

UNITED STATES PATENTS

| 3,124,513 | 3/1964 | Hawke et al. | 176/36 |
| 3,139,384 | 6/1964 | Filloleau et al. | 176/36 |
| 3,170,844 | 2/1965 | Nicoll | 176/36 |

FOREIGN PATENTS OR APPLICATIONS 915,808  1/1963  Great Britain ........................ 176/36

Primary Examiner—Benjamin R. Padgett
Assistant Examiner—Harvey E. Behrend
Attorney—Allison C. Collard

[57] ABSTRACT

A control rod drive unit for use with nuclear reactors having a motor for effecting movement of a drive rod coupled to the control rod between positions corresponding to full insertion and full withdrawal of the control rod with respect to the reactor. There is also provided a seal for providing a gas tight sealing between the drive rod and the cover of the nuclear reactor with the motor connected to the drive rod, and a further seal for sealing the drive rod to the reactor operative upon the means for disconnecting the motor from the drive rod, and a further means for partially disengaging the first seal from the reactor cover.

9 Claims, 2 Drawing Figures

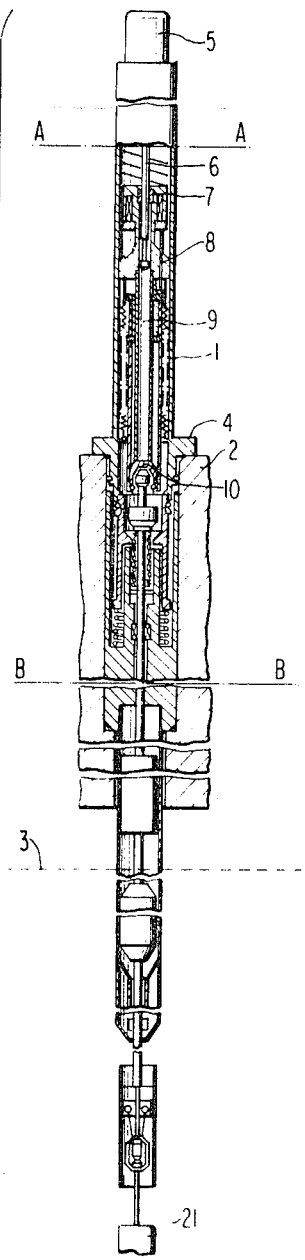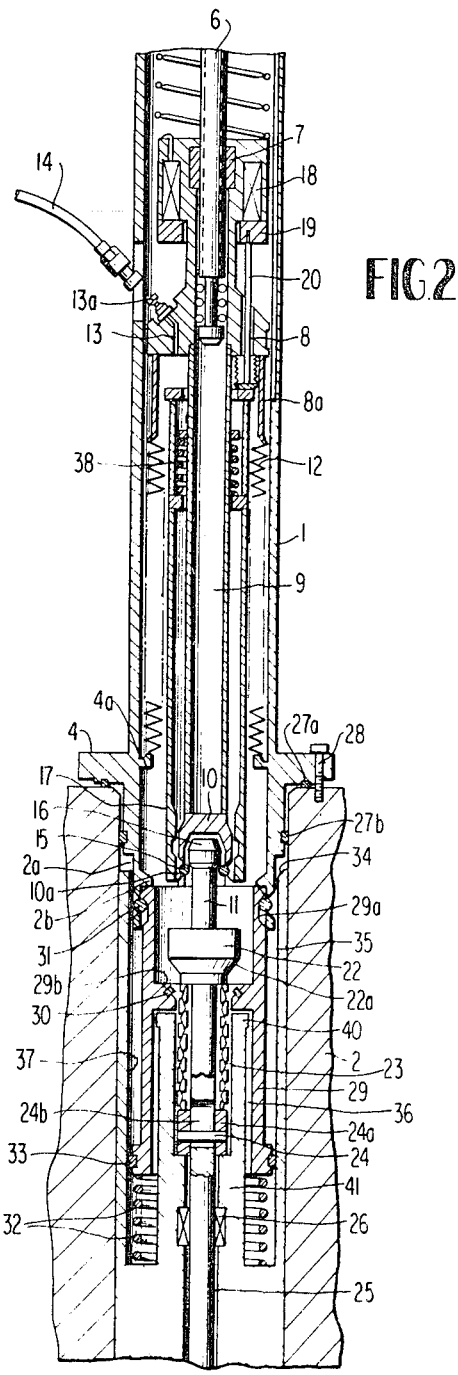

CONTROL ROD DRIVE UNITS FOR NUCLEAR REACTORS

This invention relates to control rod drive units for nuclear reactors, and, more particularly, to drive units disengagable from the respective associated control rod while preventing egress of gases from the nuclear reactor pressure vessel through the control rod drive housing penetrating the vessel.

A control rod drive unit for a nuclear reactor according to the present invention includes a motor for effecting movement of a drive rod couplable to a control rod between positions corresponding to full insertion and full withdrawal of the control rod in relation to an associated nuclear reactor, first means for effecting gastight sealing between the drive rod and a cover of the nuclear reactor with the motor connected to the drive rod and second means for sealing the drive rod to the reactor operative upon disconnection of the motor from the drive rod, and at least partial disengagement of the first sealing means from the reactor cover.

It is therefore an object according to the present invention to provide a control rod drive apparatus for nuclear reactors which can be disengaged from the control rods while preventing egress of gases from the reactor pressure vessel.

Other objects and features of the present invention will become apparent from the following detailed description considered in connection with the accompanying drawing which discloses one embodiment of the present invention. It should be understood, however, that the drawing is designed for the purpose of illustration only and not as a definition of the limits of the invention.

In the drawing, wherein similar reference characters denote similar elements throughout the two views:

FIG. 1 is a fragmental, partly sectioned elevation view of a nuclear reactor showing a control rod unit and associated drive with the control rod in its fully inserted position; and, FIG. 2 is a portion of FIG. 1 taken between the lines AA and BB, in an enlarged scale.

Referring to the drawings, the control rod unit is accommodated in a guide tube 35 and a drive housing 1 extending through a reactor cover 2, and extends into a reactor vessel (shown only outline form), the liquid level in which is indicated by the numeral 3. The drive housing is formed with a flange 4, and is secured to the reactor cover 2 by bolts 28 extending through the flange. A drive motor housing 5 is mounted on the upper end of the drive housing, and is connected to drive an axially restrained spindle 6 which co-acts with a spindle nut 7 secured in a lifting unit 8 to effect axial movement of the unit upwardly from or downwardly to the fully inserted position shown. Lifting unit 8 is connected to tubular connector 9 and disengagable coupling 10, which connects to a lifting rod 11. Disengagement of the coupling is effected through means remote from the coupling (hereinafter described) when a quick shut-down of the nuclear reactor is required, so that the portion of the control rod drive unit below the coupling and the control rod are separated from the drive unit and dropped under the action of gravity, to the fully inserted position.

A metal bellows 12 is positioned between a cylindrical flange 8a on lifting unit 8, and an internal shoulder 4a on the housing 1, and serves to seal the housing to the lifting unit while permitting full axial movement of the lifting unit between the fully inserted position, and the fully withdrawn position of the control rod. Since bellows 12 extends between a part of the lifting units above the disengageable coupling 10 and the housing, the bellows are not required to accommodate the very rapid movement of the control rod upon a quick shutdown, but only the slow movements upon adjusting the axial position of the control rod.

Lifting unit 8 is formed with a passage 13 and is provided with a connecting nipple 13a for a hose 14, for injecting a purging gas into the interior of the drive housing when required to purge any fusion gases present in the interior of the drive housing back into the reactor vessel. Disengageable coupling 10 is in the form of a socket and ball latch joint, and consists of balls 15 radially movable in apertures 10a in coupling 10, and when urged into a radially inner position, will bear against the frustoconical underside of a mushroom-shaped head 16 on the connecting rod to retain the head within the socket bore of coupling 10. As shown in FIG. 2, balls 15 are held in the radially inner position by the action of an actuating sleeve 17, the lower portions of which bear against the balls. The sleeve is connected through tie bars 20 (one only of which is shown), extending through the lifting unit, and sealed thereto with metallic bellows seals, to an armature 19 associated with a solenoid coil 18. When the coil 18 is energized, the armature is attracted upwardly to hold actuating sleeve 17 in its raised position against the action of a spring 38. To effect disengagement of the coupling, coil 18 is de-energized, and the actuating sleeve is urged downwardly by the action of spring 38 until recesses in the lower part of the actuating sleeve, come into registration with apertures 10a and balls 15 in the coupling, since the underside of the mushroom shaped head is frustoconical so that the balls are urged outwardly by the weight of the control rod supported by the head into the recesses in the actuating sleeve, thereby releasing the head. The disengagement may be effected regardless of the axial position of the lifting unit to effect release of the control rod for rapid insertion if a quick shutdown of the reactor is required.

Lifting rod 11 is connected to a control rod 21 by a claw coupling (shown in outline in FIG. 1) which, is not disengagable without removal of the complete assembly from the reactor vessel, a task which is not normally possible. Lifting rod 11 is guided and located in a bore 25 of a guide tube 36 by a bearing 26. To avoid damage to the control rod and the associated portion of the lifting unit due to the bottoming of the lifting rod at the terminal position when a quick shutdown is performed, shock absorbing ring springs 23 are provided between the base of a collar 22 on the lifting rod and a stop ring 24a for bearing, in the terminal position shown, against the base of a counter-bore in guide tube 36. Stop ring 24a is secured to lifting rod 11 by a pin 24 extending through a slot 24b in the lifting rod, the axial length of the slot determining the permitted, shock-absorbing, compression of the springs 23 upon the stop ring encountering the base of the counterbore in the guide tube following a quick shut-down action.

Sealing rings 27a and 27b are provided respectively between flange 4 and reactor cover 2, and between the lower extension 2a of the housing and the wall of the associated bore in reactor cover 2. The sealing rings, together with the flexible metallic bellows serve to prevent egress of gases from the reactor vessel. In order to permit removal of the upper part of the drive unit without allowing the gases to escape, additional seals are provided. Thus, there is provided a sealing tube 29, axially movable in a manner hereinafter described, carrying a sealing ring 33 co-acting with internal wall 37 of an upper extension 35 of guide tube 36, and a sealing ring 30 mounted in a frusto-conical face 29b on tube 29 which, in following upward movement of the sealing tube, co-acts with a frusto-conical surface 22a on collar 22 to prevent egress of gases from the reactor vessel. Sealing tube 29 is normally connected to the lower extension 2a of housing 1 by a second socket and ball latch joint consisting of balls 31, radially movable in apertures in the lower extension 2a of the housing, and when urged into a radially inner position, bear against the face of a circumferential groove 29a in the upper part of the sealing tube to retain the upper part of the sealing tube within lower extension 2a of the housing. Balls 21 are held in the radially inner position by action of inner wall 37 of upper extension 35 of guide tube 36. Thus sealing tube 29 is coupled to housing 1 and, during the initial stages of removal of the housing, is carried upwardly with the housing. Egress of gas at this stage is prevented by sealing ring 27b. A spring 32, extending between the sealing tube and the guide tube, assists the upward movement of the sealing tube, guided by a shoulder on the guide tube, until balls 31 are carried above the level of the bevelled upper end 34 of extension 35, and are free to move to a radially outer position, so as to release the sealing tube from housing 1. At this stage, sealing ring 30 contacts the frusto-conical face 22a of collar 22, and sealing is effected by two rings 30 and 33, the lifting rod having been uncoupled from the drive at the outset of the removal operation, so that the housing and drive may be removed without any danger of gases escaping from the reactor. To replace the housing, the procedure is reversed. The lower extension of the housing is introduced into the upper end of the channel and, as balls 31 ride over the bevelled upper edge 34 of the upper extension of the guide tube, it is coupled to the sealing tube. The housing and sealing tube are then forced downwardly, compressing spring 32, allowing sealing ring 27b to contact the reactor cover and disengage sealing ring 30 from collar 22. Finally, full insertion of the lower extension is effected and bolts 28 are tightened down to render the sealing ring 27a effective. Coupling 10 is then located on mushroom head 16 of lifting rod 11, and coil 18 is energized to link the drive motor to the control rod.

While only a single embodiment of the present invention has been shown and described, it will be understood that many changes and modifications may be made thereunto without departing from the spirit and scope of the invention.

What is claimed is:

1. In a control rod drive in a nuclear reactor for controlling the axial movement of a control rod between positions corresponding to full insertion and full withdrawal of the control rod with respect to the core of the nuclear reactor, the reactor being of a type including a reactor vessel, liquid disposed within the reactor vessel around the cores, and a reactor cover having an opening disposed in its top surface for admitting the control rod to the reactor vessel, the combination comprising;
    a motor for controlling the movement of the control rod,
    a drive rod coupled to said motor,
    a lifting unit coupled to said drive rod,
    a lifting rod coupled to the control rod,
    means for coupling said lifting unit to said lifting rod, including a socket and ball lock joint coupled to said lifting unit, and a frusto-conical member affixed to said lifting rod which is received by said socket and ball lock joint,
    a cylindrical housing affixed to the cover of the nuclear reactor, encompassing said motor, drive rod, lifting unit, lifting rod, and said coupling means, said housing having one end disposed in the opening in the reactor cover, and including an annular flange affixed to its outer surface at one end for securing said housing on the reactor cover,
    an elongated bellows disposed within said cylindrical housing and coupled at one end to said lifting unit and at the other end, to the inside surface of said cylindrical housing for sealing said lifting unit to said cylindrical housing, and permitting axial movement of said lifting unit between the full insertion and full withdrawal positions while maintaining said seal, and
    a first ring seal disposed between the reactor cover and said annular flange on said cylindrical housing, and a second ring seal disposed between the end of said cylindrical housing disposed within the opening in the reactor cover, and the inside surface of the opening, said ring seals preventing, in conjunction with said bellows, the egress of gases from the reactor vessel of the nuclear reactor, and additional means for preventing egress of gases from the reactor vessel upon removal of said housing.

2. The combination as recited in claim 1, wherein said coupling means comprises;
    a first, elongated tubular cylinder rigidly affixed to said lifting unit, and having a socket affixed at one end thereof for receiving said frusto-conical coupling member affixed to said lifting rod, and
    a second elongated tubular cylinder disposed about said first cylinder, and slidably coupled to said lifting unit, said second cylinder having radially disposed recesses provided at one end thereof for receiving the ball members of said socket and ball lock joint when the end of said cylinder is moved adjacent said socket and ball lock joint, thereby releasing said frusto-conical member from said socket and permitting said lifting rod and the control rod to free-fall to the full insertion position relative to the nuclear reactor core, and thereby effect a rapid shut-down of the nuclear reactor.

3. The combination as recited in claim 2, wherein said lifting unit includes an annular coupling member coupled to said second tubular cylinder of said coupling means, and slidably disposed about said lifting unit so as to be slidable vertically upwardly and downwardly, and a solenoid, rigidly affixed to said lifting unit adjacent said coupling member for controlling the vertically upward and downward movement of said coupling unit.

4. The combination as recited in claim 3 wherein said additional means comprises;
- a cylindrically shaped guide tube, disposed within the opening in the reactor cover below said cylindrical housing,
- a cylindrically shaped sealing tube disposed within said guide tube and surrounding said lifting rod,
- a frusto-conical collar affixed to said lifting rod below said frusto-conical coupling member and disposed within said cylindrical sealing tube,
- means for detachably coupling said sealing tube to said cylindrical housing,
- spring means disposed below and engaging the bottom end of said sealing tube for forcing said sealing tube vertically upwardly in said guide tube so as to engage the end of said cylindrical housing, and
- a first ring seal disposed on the outside surface of said sealing tube so as to engage said guide tube, and a second ring seal disposed within said sealing tube on the inside surface thereof below said frusto-conical collar, for engaging said frusto-conical collar on said lifting rod when said cylindrical housing is detached from said sealing tube and said spring means forces said sealing tube vertically upwardly within said guide tube, said first and second ring seals preventing egress of gases from the nuclear reactor vessel through the opening in the reactor cover, when said cylindrical housing is removed.

5. The combination as recited in claim 4, wherein said means for detachably coupling said cylindrical housing to said sealing tube comprises a socket and ball lock joint, including a plurality of ball members disposed within apertures provided in the end of said cylindrical housing, and an annular groove disposed circumferentially about one end of said sealing tube adjacent said apertures and ball members in said cylindrical housing, said ball members being forced radially inwardly by said guide tube, thereby locking said cylindrical housing to said sealing tube, and said spring means forcing said sealing tube vertically upwardly within said guide tube and thereby biasing said socket and ball lock joint on said housing towards an unlocked position.

6. The combination as recited in claim 5 further comprising shock absorbing means disposed about said lifting rod below said frusto-conical collar within said sealing tube, for cushioning the control rod during movement to its fully inserted position during quick shutdown of the nuclear reactor, and thereby preventing damage to the control rod and said lifting unit.

7. The combination as recited in claim 6, wherein said guide tube further comprises a cylindrically shaped counter-bore, disposed vertically upwardly within said guide tube around said lifting rod, and having its lower end connected to said guide tube so as to form an annular base between said guide tube and counter-bore, and wherein said shock absorbing means comprises a plurality of spring rings disposed about said lifting rod within said counter-bore between said frusto-conical collar and said base of said counter-bore.

8. The combination as recited in claim 7, wherein said drive rod is an axially restrained spindle coupled to said motor, and wherein a spindle is affixed to said lifting unit for receiving said drive rod spindle, thereby providing axial movement of said lifting unit in vertically upward and downward directions.

9. The combination as recited in claim 8, wherein said sealing tube is disposed over the end of said counter-bore, and wherein said spring means is a coil spring disposed about said counter-bore between said base of said counter-bore and one end of said sealing tube.

* * * * *